(12) United States Patent
Collins, III et al.

(10) Patent No.: US 8,135,372 B2
(45) Date of Patent: Mar. 13, 2012

(54) INTEGRATED CANCELLATION CIRCUIT FOR RF CONVERTER SPURIOUS TONES

(75) Inventors: Thomas E. Collins, III, Tyngsboro, MA (US); Douglas S. Jansen, Pelham, NH (US)

(73) Assignee: BAE Systems Information and Elecronic Systems Integration Inc., Nashua, NH (US)

( * ) Notice: Subject to any disclaimer, the term of this patent is extended or adjusted under 35 U.S.C. 154(b) by 351 days.

(21) Appl. No.: 12/555,355

(22) Filed: Sep. 8, 2009

(65) Prior Publication Data
US 2011/0059714 A1 Mar. 10, 2011

(51) Int. Cl.
*H04B 1/10* (2006.01)
*H04K 3/00* (2006.01)

(52) U.S. Cl. .................................... 455/296; 455/295

(58) Field of Classification Search .............. 455/295, 455/296, 310, 311
See application file for complete search history.

(56) References Cited

U.S. PATENT DOCUMENTS

| | | | |
|---|---|---|---|
| 3,894,219 A | 7/1975 | Weigel | |
| 4,918,748 A | 4/1990 | Shahriary et al. | |
| 5,524,281 A | 6/1996 | Bradley et al. | |
| 6,373,344 B1 | 4/2002 | Mar | |
| 6,570,458 B2 | 5/2003 | Cuddy | |
| 7,308,234 B2 | 12/2007 | Kintis | |
| 7,428,683 B2 | 9/2008 | Dai et al. | |
| 7,542,812 B2 | 6/2009 | Stroili et al. | |
| 7,558,543 B2 * | 7/2009 | Isaac et al. ............ 455/130 |
| 7,899,142 B2 * | 3/2011 | Hayashi et al. ......... 375/346 |
| 2002/0145475 A1 | 10/2002 | Fenton et al. | |
| 2003/0134610 A1 | 7/2003 | DiCamillo et al. | |
| 2008/0252384 A1 | 10/2008 | Chow et al. | |
| 2009/0080498 A1 | 3/2009 | Deisher et al. | |
| 2009/0181632 A1 * | 7/2009 | Shiba et al. ............ 455/296 |

OTHER PUBLICATIONS

"Co-site Interference Mitigation for VHF/UHF Communications", Navy SBIR 2008.1—Topic N08-93.
Weber et al., Theoretical and Practical Radio Frequency Interference Mitigation Developments at Nancay Observatory.
Behbahani, et al., "CMOS Mixers and Polyphase Filters for Large Image Rejection", IEEE Journal of Solid-State Circuits, vol. 36, No. 6, Jun. 2001.
International Search Report with Written Opinion, dated Nov. 17, 2010, received in international patent application No. PCT/US2010/049023, 14 pgs.

* cited by examiner

*Primary Examiner* — Lee Nguyen
(74) *Attorney, Agent, or Firm* — Finch & Maloney PLLC; Neil F. Maloney; Daniel J. Long (57) ABSTRACT

Techniques are disclosed for eliminating or otherwise sufficiently suppressing spurious signals. The techniques are particularly useful in applications such as those that employ aggressor frequency sources along with a frequency conversion or mixing function, and especially applications implemented as a system-on-chip. In the spur-training mode, a spur-canceller circuit identifies spurious tones associated with the host system to neutralize those tones when running in a normal mode. The tones are neutralized using a comb generator with variable phase and gain by way of cancellation with comb output signals having substantially the same amplitude and a phase that is 180° out of phase with the aggressor tone to be cancelled.

20 Claims, 7 Drawing Sheets

INTEGRATED CANCELLATION CIRCUIT FOR RF CONVERTER SPURIOUS TONES

STATEMENT OF GOVERNMENT INTEREST

The invention claimed in this patent application was made with U.S. Government support under contract no. FA8650-09-C-7926 awarded by the United States Department of the Air Force. The U.S. Government has certain rights in the invention.

FIELD OF THE INVENTION

The invention relates to communications and RF receivers, and more particularly, to a cancellation of aggressor tones that result in spurious tones in integrated RF converter applications.

BACKGROUND OF THE INVENTION

A spurious tone is a tone at the output that is not deliberately created, transmitted, or otherwise intentionally created. Such spurious tones commonly arise in circuits that include multiple unmodulated frequency sources, such as circuits that include local oscillators and/or clocking signals. Example causes of spurious tones may include, for instance, harmonic tones of aggressor sources as well as frequency conversion and intermodulation products. Depending on the application, such spurious tones can be highly undesirable.

Communications applications can be particularly sensitive to spurious signals. For instance, undesirable spurious tones that mix into the final intermediate frequency (IF) of an RF converter tend to manifest in the mixer output and cause receiver performance problems (e.g., down-conversion errors, effective disablement of receiver front-end, communication errors, etc). Such receiver performance problems can be even more significant when the RF converter and the spurious signal source are implemented on the same integrated circuit or substrate.

One way to remedy such spurious issues is to place the RF converter on a separate chip from the spurious source to eliminate on-chip leakage of the spurious source into the converter circuit and/or placing bulky Faraday cages around the converter. However, using separate chips tends to increase the size, weight, and power of system, and places an effective limit on future integration. Another remedy is to back-off power of the local oscillator driver (or other aggressor frequency source). Reducing the aggressor source drive power, however, can have a performance impact on performance parameters such as gain, noise figure, and linearity.

There is a need, therefore, for techniques for eliminating or otherwise sufficiently reducing spurious tones, in applications such as those that employ one or more frequency sources along with a frequency conversion or mixing function, and especially applications implemented as a system-on-chip.

SUMMARY OF THE INVENTION

One embodiment of the present invention provides a method for canceling spurious tones in an RF converter having a mixer and an output. The method includes, in a spur-training mode wherein a spurious tone associated with an aggressor source is present, generating a set of phase coherent harmonics of the aggressor source using a comb generator with variable phase and gain. The method continues with inserting the harmonics into a signal path prior to the mixer, and adjusting gain and phase of the comb generator while monitoring the output of the RF converter until the spurious tone is reduced to an acceptable level. After the spurious tone is reduced to an acceptable level, the method continues with storing the corresponding gain and phase settings of the comb generator along with a corresponding aggressor source state identifier. The method may further include, in a normal mode, retrieving comb generator gain and phase settings associated with the aggressor source state identifier to generate a comb output that includes a tone that will cancel the spurious tone, and inserting the comb output into the signal path prior to the mixer, thereby canceling the spurious tone. In one particular case, during the spur-training mode, the method includes the preliminary steps of sweeping the aggressor source across all expected states and monitoring the output of the RF converter, and recording an identifier of each aggressor source state that results in a spurious tone to be cancelled in normal mode. In another particular case, generating a set of phase coherent harmonics of the aggressor source using a comb generator with variable phase and gain comprises coupling energy from the aggressor source and filtering to minimize peak comb output relative to the spurious tone. In another particular case, storing the corresponding gain and phase settings of the comb generator along with a corresponding aggressor source state identifier comprises recording the corresponding gain and phase settings in a lookup table that is indexed by aggressor source state identifiers. In one such case, the method further includes determining, in a normal mode, that the aggressor source is associated with the aggressor source state identifier, and that the aggressor source state identifier corresponds to an entry in the lookup table.

Another embodiment of the present invention provides a system for canceling spurious tones in an RF converter having a mixer and an output. The system includes a comb generator with variable phase and gain for generating, in a spur-training mode wherein a spurious tone associated with an aggressor source is present, a set of phase coherent harmonics of the aggressor source. The system further includes a summer module for inserting the harmonics into a signal path prior to the mixer. The system further includes a digital controller for adjusting gain and phase of the comb generator while monitoring the output of the RF converter until the spurious tone is reduced to an acceptable level. The system further includes a memory for storing, after the spurious tone is reduced to an acceptable level, the corresponding gain and phase settings of the comb generator along with a corresponding aggressor source state identifier. In one particular case, the digital controller is further configured for retrieving from the memory, in a normal mode, comb generator gain and phase settings associated with the aggressor source state identifier to generate a comb output that includes a tone that will cancel the spurious tone, and the summer module is further configured for inserting the comb output into the signal path prior to the mixer, thereby canceling the spurious tone. In another particular case, during the spur-training mode, the aggressor source is swept across all expected states, and the digital controller is further configured for monitoring the output of the RF converter and recording in the memory an identifier of each aggressor source state that results in a spurious tone to be cancelled in normal mode. In another particular case, the comb generator with variable phase and gain for generating a set of phase coherent harmonics of the aggressor source is further configured for coupling energy from the aggressor source and filtering to minimize peak comb output relative to the spurious tone. In another particular case, the memory for storing the corresponding gain and phase settings of the comb generator along with a corresponding aggressor source state identifier comprises a lookup table for recording the corresponding gain and phase settings and that is indexed by aggressor source state identifiers. In one such case, the digital controller is further configured for determining, in a normal mode, that the aggressor source is associated with the aggressor source state identifier, and that the aggressor source state identifier corresponds to an entry in the lookup table. The may be included, for example, in a system-on-chip configuration (e.g., receiver or RF converter on chip). In one specific case, the RF converter is a dual RF converter having first and second converter stages, and the aggressor source is a local oscillator associated with the first converter stage. Other embodiments can include any combination of the various functionalities and structure described herein.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Techniques are disclosed for eliminating or otherwise sufficiently reducing spurious tones. The techniques are particularly useful in applications such as those that employ aggressor frequency sources along with a frequency conversion or mixing function, and especially applications implemented as a system-on-chip.

General Overview

When multiple clock or local oscillator (LO) sources are present on a die, a variety of coupling mechanisms (e.g., such as the doped substrate, and off-chip paths) allows those sources to cross couple with each other in the signal path to produce in-band spurious tones. This limits the spurious free dynamic range (SFDR) or frequency-planning space. For spur cancellation, the amplitude and phase of mixer product spurs are unknown a priori due to variations in component mismatch and substrate doping level. Process variations in the cancellation path are statistically independent of leakage paths. This limits efficacy of static/fixed compensation techniques. While conventional trimmed or statically compensated approaches (generally, fixed cancellation circuits) can be used to achieve some cancellation, the degree of that cancellation is oftentimes inadequate for the application at hand (i.e., more spurious attenuation is needed than can be provided). Moreover, greater cancellation with such conventional approaches can be limited by a need to achieve demanding IQ gain matching (e.g., 0.1 dB or better) and phase matching (e.g., ½ degree or better). In addition, post-manufacturing processes such as trimming involve tend to increase cost and opportunity for error.

The techniques provided herein can be employed in a number of contexts, such as system-on-chip applications that employ a frequency conversion or mixing function along with aggressor frequency sources. The aggressor source could be, for example, a clock for digital circuitry, or the local oscillator from a first frequency conversion circuit in an integrated circuit configured for dual frequency conversion. Any number of on-chip sources may cause undesired spurious tones. Note, however, that aggressor tones may also be provided by off-chip sources as well. In any such cases, the spurious tone can be effectively cancelled in accordance with embodiments of the present invention if the aggressor frequency source can be coupled phase coherently.

For purposes of this disclosure, a signal at the output of the converter that is present in the absence of a signal at the input is generally referred to as a spurious tone. An unmodulated frequency source that results in a spurious tone is generally referred to herein as an aggressor source ($T_A$). The harmonic tone of an aggressor source (possibly the fundamental tone, but not necessarily) that results in a spurious tone at the converter output is generally referred to as tone $T_{AH}$. Thus, there are three quasi-related items: (1) an aggressor source $T_A$; and (2) a harmonic or tone $T_{AH}$ of the aggressor source $T_A$; and (3) a corresponding spurious tone that manifests at the RF converter output, if tone $T_{AH}$ is mixed. By canceling tone $T_{AH}$ prior to the mixing function as described herein, the corresponding spurious tone at the RF converter output is suppressed. With this relationship in mind, note that the spurious tone that results from the tone $T_{AH}$ is sometimes referred to herein as the spurious tone $T_{AH}$ for ease of description. Further note that expressions such as "canceling spurious tone $T_{AH}$" or "canceling harmonic $T_{AH}$" or "suppressing the spurious tone" or "canceling the spurious tone" may be used interchangeably, and generally refer to the cancellation of $T_{AH}$ prior to the mixing function to suppress the corresponding spurious tone at the RF converter output.

Further, and in accordance with one example embodiment, assume the application at-hand is a dual RF conversion system-on-chip (SoC), wherein the system includes two converter circuits each having its own local oscillator (LO1 and LO2, respectively) and mixer. The output of the first mixer provides the input to the second mixer. In such dual-conversion SoCs, there is typically insufficient isolation between the two converters to prevent LO1 harmonics, generated by the first converter LO1 buffer, from leaking into the second converter and mixing with LO2 harmonics and creating cross-product spurs. Some of these spurs will manifest in the IF2 band. Thus, and in accordance with an embodiment of the present invention, these spurs can be suppressed to a suitable level (e.g., 20 dB or more of suppression). Other embodiments of the present invention may involve single RF conversion SoC applications, or any other electronics application that can benefit from spurious cancellation as described herein. The present invention is not intended to be limited to dual RF conversion applications.

In accordance with one example embodiment, a spur-canceller circuit can be implemented within a broadband dual-conversion RF system (e.g., 2 to 18 GHz receiver-on-chip device). In such cases, a source of aggressor tones can be the LO1. Thus, an objective of the spur-canceller circuit can be to cancel an $n^{th}$ order harmonic resulting from the LO1 that couples into the RF chain via a leakage path and is down converted into the final IF. The system can operate in a normal RF receiver mode or a spur-training mode. In the spur-training mode, the spur-canceller circuit of the system is enabled in the absence of any signal at the input. Any tone at the output is by definition spurious. The spurious tone is neutralized by way of cancellation with corresponding signals having substantially the same amplitude and a phase that is 180° out of phase with the aggressor tone to be cancelled. Once trained, the spur-canceller can run in normal RF receiver mode to ensure any energy at the output is the result of a signal at the input.

In more detail, during the spur-training mode, the antenna is decoupled from the front-end or otherwise disabled, and the aggressor source (i.e., LO1 in this example case) is coupled into the spur-canceller circuit. In one example embodiment, the spur-canceller circuit includes a variable gain phase rotator (VGPR) and a comb generator. The comb generator effectively takes the output of the VGPR (which is at the LO1 frequency) and produces a set of $n^{th}$ order harmonics with substantially equal amplitudes (e.g., within +/−2.0 db of one another). The VGPR adjusts the amplitude and phase of all harmonics simultaneously, until the targeted spur is sufficiently suppressed. The VGPR phase and gain settings that caused the spur to be suppressed are stored for use during normal RF receiver mode when the corresponding aggressor source associated with the spur is active. During normal RF receiver mode, when the aggressor source is active, the VGPR is set accordingly and the comb output includes a tone that causes the in-band spur to be cancelled. The additional products of the comb generator are generally out-of-band (e.g., removed by passband filter or other suitable out-of-band cleaning mechanism).

RF Converter Architecture

Figure 1:
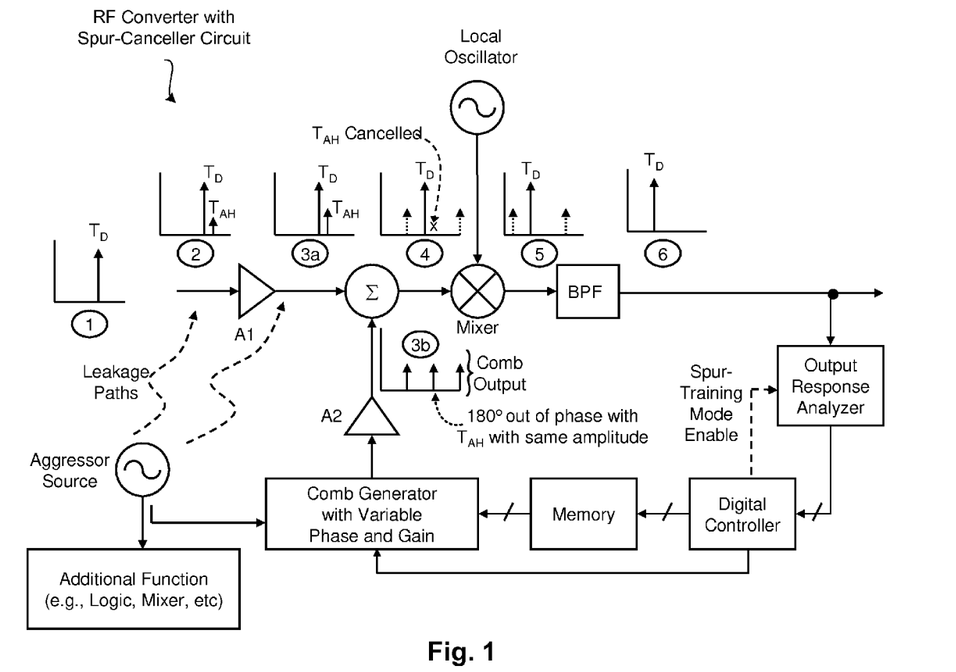
FIG. 1 is a block diagram of an RF converter configured with a spur-cancellation circuit, in accordance with one embodiment of the present invention.

FIG. 1 is a block diagram of an RF converter system configured with a spur-cancellation circuit, in accordance with one embodiment of the present invention. This system can be, for example, a system-on-chip configuration, but other embodiments can be implemented with chip sets and/or discrete components. The system can operate in a spur-training mode (closed loop mode) and a normal RF receiver mode (open loop mode). In the spur-training mode, the spurious signal space is characterized and effectively stored (e.g., in a lookup table) for use during normal mode. During normal RF receiver mode, the RF conversion process operates as typically done, but spurious tone cancellation is provided by virtue of the trained spur-cancellation circuit and the spurious tone values learned during spur-training mode.

As can be seen, the system includes a local oscillator (LO) operatively coupled to one input of a mixer, and the output of the mixer is applied to a bandpass filter (BPF). The output of the BPF is coupled to the output response analyzer (ORA) which may or may not provide output to other standard receiver circuitry (e.g., IF filtering, demodulator, detected signal amplifier, speaker and/or monitor, etc), which is not shown but will be apparent in light of this disclosure. The system further includes a summer (E) module that has its output operatively coupled to the other input of the mixer. One input of the summer module receives input from a gain stage A1, and the other input of the summer module receives input from a gain stage A2. A feedback loop is connected from the output of the ORA to the input of gain stage A2, and includes a digital controller operatively coupled to a memory, a comb generator with variable phase and gain operatively coupled to the memory, as well as to the digital controller. The ORA can be enabled by a spur-training mode enable signal provided by the digital controller, to provide a closed loop feedback used in characterizing or otherwise learning the spurious profile as will be explained in turn. The comb output is applied to the input of gain stage A2. An aggressor tone is shown leaking into the RF converter system.

As will further be appreciated in light of this disclosure, the RF converter system can be in any configuration including both single and dual stage conversion. Likewise, standard componentry of the receiver (e.g., antenna, LNA, mixer, converter components, etc) can be implemented with any suitable technology, and may be configured as desired, depending on the demands of the target application. The present invention is not intended to be limited to any particular receiver architecture or signal processing scheme. Rather, the techniques described herein can generally be used in conjunction with any number of receiver designs and technologies, whether the application calls for broad or narrow band, high or low resolution, high or low power, analog or digital signal processing, short or long range, high or low sensitivity, discrete or integrated componentry, etc.

For purposes of this example, assume the application at-hand is a dual RF conversion, wherein the system includes two converter circuits each having its own local oscillator and mixer configuration as typically done. The first converter circuit is not shown, but its local oscillator is depicted as the aggressor source. In actuality, the first converter circuit could be used to down-convert signals captured by the antenna of the receiver from the transmission band to the first IF. The first IF would then be the input to the second converter circuit, which could generate the second IF based on the first IF and the second local oscillator. As can be seen in FIG. 1, the second local oscillator feeds the second mixer.

During operation of the RF system, the aggressor source naturally generates multiple harmonic tones. These harmonics leak into the signal path. Recall, however, that leakage may emanate from on-chip and/or off-chip. In any such cases, the leakage may enter the signal path at multiple insertion points. For instance, and as shown in FIG. 1, these insertion points can be at any number of points before and/or after the gain stage A1. As can be seen at point 1, a desired tone $T_D$ has been applied to the system. As can be further seen at point 2, the desired tone $T_D$ has propagated to the input of gain stage A1 and now has a small tone $T_{AH}$ next to it. This tone $T_{AH}$ represents leakage of some harmonic tone of the aggressor source ($T_{AH}$=m×$T_A$). At point 3a on the output of the gain stage A1, the tone $T_{AH}$ has grown due to additional leakage from some alternative path. If gain stage A1 provides amplification, then that amplification may also increase the amplitude of tone $T_{AH}$. Note, however, that gain stage A1 can be a unity gain buffer, depending of the given application. In any case, just prior to the mixer, where the frequency conversion takes place, all of the leaked signal $T_A$ can be represented as a single tone with some amplitude and phase (principle of superposition).

With further reference to FIG. 1, note that without the spur-canceller function described herein, the spurious tone $T_{AH}$ mixes with the local oscillator or one of the local oscillator's harmonics and ends up at the intermediate frequency (IF). The BPF is designed to pass the IF band, and block or otherwise sufficiently suppress everything outside of that band. The frequency of the local oscillator is chosen such that (LO+/−$T_D$) equals IF. If m×$T_A$+/−n×LO=IF, then the spur is indistinguishable from the desired tone $T_D$ at the output. Here, $m \times T_A$ represents the $m^{th}$ harmonic of $T_A$ (e.g., 3 times $T_A$, or 4 times $T_A$, etc), n represents the $n^{th}$ harmonic of $T_D$, and $m \times T_A +/- n \times LO$ is referred to as an "m×n" product of the aggressor $T_A$ and the local oscillator (LO). It is a spurious tone, because it is not related to the input at all (i.e., the desired tone $T_D$ does not appear in the equation). However, if the m×n product equals IF, it looks the same to the receiver as a desired tone $T_D$ that mixes with the LO. The LO is chosen such that $1 \times T_D +/- 1 \times LO = IF$.

However, with the spur-canceller function described herein, the aggressor signal $T_A$ is effectively sampled by the comb generator with variable phase and gain. In more detail, during spur-training mode, the digital controller asserts the spur-training mode enable signal, which enables the ORA output to the digital controller input, thereby completing the feedback loop. The spur-training mode enable signal, which can be provided by some other controller as well (internal or external to the system) if so desired, may also be used to disconnect or otherwise disable the antenna of the RF receiver's front end. Note that the antenna may remain coupled if the absence of signal at the input can be independently assured or otherwise known during the spur-training mode.

In this way, only the spurious signals of the system will be present at the ORA output (i.e., no desired tones will be present). Note that, while spurious tone amplitude and phase characteristics will vary from one chip to the next (assuming an RF converter SoC application for purposes of discussion), the spurious tone amplitude and phase characteristics for any one chip will tend to be repeatable within that chip (further assuming all other things, such as environmental conditions, remain stable). Thus, a spurious tone can effectively be learned for a given circuit (during spur-training mode), to facilitate cancellation of that spurious tone during normal operation of that circuit (normal RF receiver mode).

In the time-domain, the comb generator generates a phase-coherent pulse from the aggressor signal $T_A$. In the frequency domain, this pulse spreads the energy of the aggressor source $T_A$ across the spectrum and creates a comb (such as the spectrum shown at point 3b), with tones at all of the harmonics of the aggressor source $T_A$, including $T_{AH}$. In general, all possible $m \times T_A$ can be created at roughly the same amplitude (e.g., within +/−2.0 dB of one another, or better). The variable phase and gain, which can be implemented with a VPGR or other such suitable circuit, adjusts phase and the gain until one of the harmonics in the comb output is sufficient to cancel the aggressor tone $T_{AH}$ (when summed with tone $T_{AH}$ by the summer module). This comb output is buffered by gain stage A2, which has high output impedance and can be configured with unity gain. Thus, the phase and gain can be adjusted until one of the comb output tones is equal in amplitude and opposite in phase (180°) from the offending leakage tone $T_{AH}$. When the output of A2 is summed with the output of A1 by the summer module, the offending leakage tone $T_{AH}$ is cancelled out in the frequency domain, as can be seen at point 4 of FIG. 1 (x indicates cancelled $T_{AH}$ tone). Note, however, that while $T_{AH}$ was cancelled, the spectrum may contain other undesired tones. These undesired tones are shown by dashed tone lines before and after the mixer (as shown at points 4 and 5). They can be filtered out by the BPF, so that only the desired tone $T_D$ is left (as shown at point 6).

The ORA observes the output of the BPF. In the absence of a desired tone (e.g., such as the case during spur-training mode when the antenna is disabled or in quiet mode), any signal at the IF can be assumed to be a spurious tone. The ORA gives the amplitude of the spur to the digital controller (for purposes of assessing sufficient spur suppression/cancellation). The digital controller determines the gain and phase settings for the comb generator and makes adjustments to those settings until the spur is sufficiently suppressed. As an example, a gradient descent algorithm can be used to minimize the power seen at the ORA. After the spur is sufficiently suppressed, the gain and phase settings of the comb generator with variable gain and phase are stored in memory, along with a corresponding aggressor source $T_A$ identifier. Thus, when the $T_A$ identifier is observed or otherwise detected during normal operation, the corresponding comb generator gain and phase settings can be accessed from the memory to provide spur suppression. These values stored in the memory can be updated as needed (e.g., at start-up, over temperature change, over time to compensate for aging, after a component change, after an update to calibration factors, or other changes that will impact amplitude and phase associated with a spur of a given circuit).

The local oscillator can be tuned to mix a specific RF band down to the IF. If the local oscillator changes, the m×n products will be different. It is expected that there will be a fixed number of crossing spurs that land at the IF. These spurs will change in amplitude across temperature, time, and process variation, but their location in the spectrum is mathematically fixed. So, as previously explained, once the list of offending spurs are determined for a given receiver, a lookup table (the memory operatively coupled to the digital controller) can be created with the correct gain and phase settings (for the comb generator) for each setting of the local oscillator that creates a spur. Whenever the local oscillator is set to a frequency that has a known spur (e.g., as detected by the ORA or digital controller), the spur canceller can be turned on and take its values from the lookup table and apply those values to the summer module to effect the desired spur cancellation. In one example embodiment, for instance, the digital controller effectively turns-on the spur-canceller by enabling gain stage A2 when the digital controller (or ORA) detects the local oscillator is set to a frequency that has a known spur. Alternative embodiments can leave the spur-canceller enabled always (e.g., set to minimum gain when no spur is present), but such a configuration may consume more power. Any number of such enablement and power conservation schemes will be apparent in light of this disclosure. In the example case shown, the comb generator provides its comb output (to gain stage A2) based on an amplitude and phase setting (corresponding to the tone $T_{AH}$) provided from memory (e.g., lookup table) to the comb generator in response to the digital controller or ORA detecting the local oscillator is set to a frequency that has a known spur. In accordance with one embodiment, a lookup table comprising the memory can be indexed, for instance, by local oscillator frequency or other suitable LO identifier. Thus, when a given local oscillator frequency is input to the lookup table by the digital controller, the lookup table outputs the corresponding amplitude and phase settings for the comb generator. One of those tones in the comb output will be 180° out of phase with the tone $T_{AH}$ but have substantially the same amplitude (e.g., within +/−0.1 dB), so that when summed with tone $T_{AH}$, a cancellation of tone $T_{AH}$ occurs. In the example shown, the tone in the middle of the comb is the one that matches $T_{AH}$ (as indicated by the dashed line and labeled accordingly).

Typically, the leakage tone is small (e.g., −30 dBc or lower), and that the added cancellation signal will not push the mixer into compression (i.e., the gain of the mixer for various products will remain the same regardless of whether the cancellation signal is applied or not). Thus, adding a small cancellation tone won't change the gain characteristics of the mixer.

Each of the local oscillator, summer module, mixer, and BPF can be implemented as with conventional technology. In one specific example embodiment, the LO is implemented with an oscillator in the range of 1.0 to 2.0 GHz (e.g., 1.25 GHz), the mixer is implemented with a Gilbert cell mixer configured for providing an IF in the range of 0.1 to 1.0 GHz (e.g., 0.25 GHz) from an input signal in the range 1.0 to 2.0 GHz (e.g., 1.0 GHz), and the BPF is implemented with an active filter that provides 40 dB/decade of roll-off (double-pole or better). Any number of suitable configurations can be used to execute these functions, and the present invention is not intended to be limited to any particular configurations.

Gain stage A1 may be, for example, a dedicated buffer or a part of the mixer such as the transconductance stage of a Gilbert mixer. Gain stage A2 may also be implemented with conventional technology (e.g., unity gain buffer), and provides high-output impedance to the low-impedance summing node. As previously explained, gain stage A2 can be disabled (e.g., by digital controller) when there is no spurious tone to cancel as well as during normal RF receiver mode, thereby preserving power of the RF converter. Gain stage A2 may also implement the variable gain function of the VGPR.

Figure 2A:
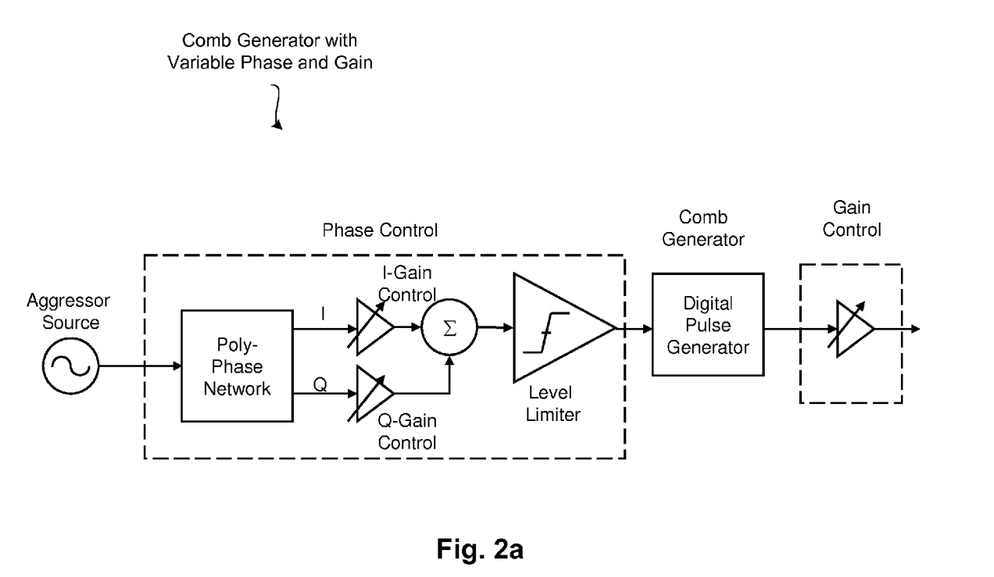
FIG. 2a is a block diagram of a comb generator with variable phase and gain that can be used in the RF converter of FIG. 1, in accordance with one embodiment of the present invention.

As previously explained, the comb generator with variable phase and gain can be implemented using a VPGR. FIG. 2a is a block diagram of an example one such comb generator with variable phase and gain, configured in accordance with one example embodiment of the present invention. The poly-phase network generates quadrature tones, I and Q, based on the aggressor source, $T_A$. The level of each I and Q channel is adjusted by the I-gain and Q-gain control blocks, respectively, to adjust the phase of $T_A$ to an appropriate precision (e.g., 1 degree or less). The summer $\Sigma$ module sums the leveled I and Q quadrature tones, and the level limiter limits the summer module output to a desired digital signal level while preserving phase information. The digital pulse generator receives the output of the level limiter, and generates a family of phase coherent harmonics of aggressor source $T_A$ (e.g., $m \times T_A$, where m=3 to 10, or higher). The gain control block receives the pulses output by the digital pulse generator and adjusts pulse levels as desired (e.g., based on input from memory, as previously explained).

Figure 2B:
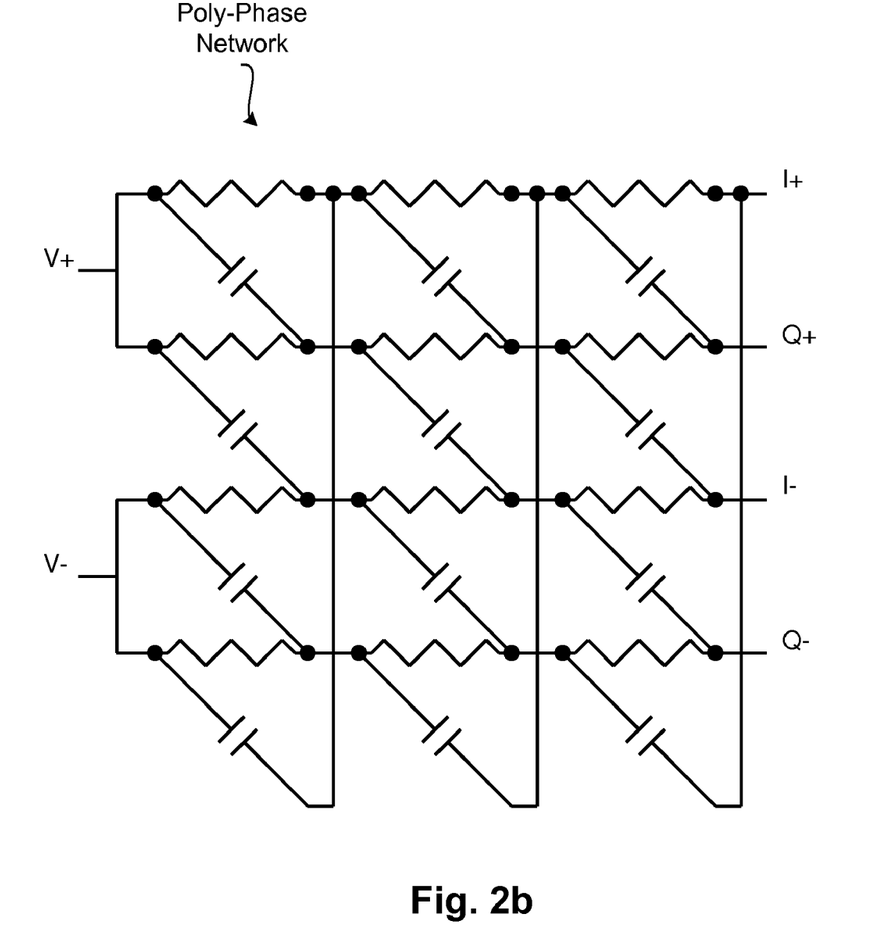
FIG. 2b is a block diagram of a poly-phase network that can be used in the comb generator with variable phase and gain of FIG. 2a, in accordance with one embodiment of the present invention.

FIG. 2b is a block diagram of an example poly-phase network, which can be implemented with conventional technology. In this particular case, a third order poly-phase network is used, but other embodiments can use other poly-phase network of any order, depending on demands of the target application. As can be seen, the network is implemented with a number of resistive and capacitors operatively coupled as conventionally done, and there is one differential input (V+,V−), and two differential output: (I+,I−) and (Q+, Q−). As will be apparent in light of this disclosure, the network operates to generate I and Q quadrature tones that are 90 degrees apart, and the I-gain and Q-gain block adjust the channel magnitudes such that the resulting vector sum has adjustable phase.

Figure 3:
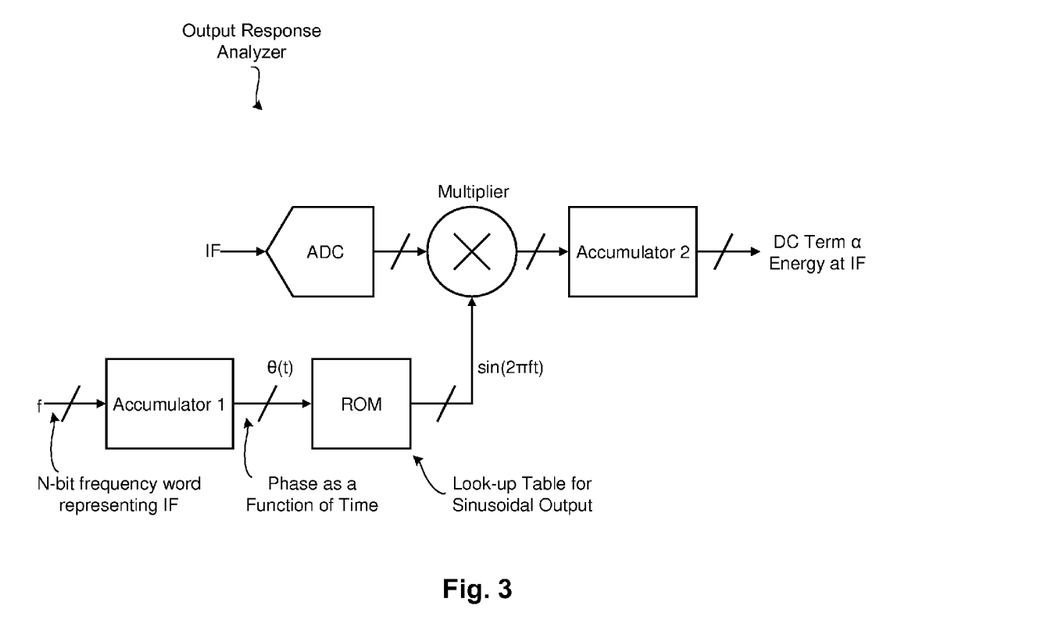
FIG. 3 is a block diagram of an output response analyzer (ORA) that can be used in the RF converter of FIG. 1, in accordance with one embodiment of the present invention.

FIG. 3 is a block diagram of an example output response analyzer (ORA), in accordance with an embodiment of the present invention. As can be seen, the ORA is implemented with an analog-to-digital convert (ADC) and a digital multiplier and accumulator. In operation, the digital representation of the IF generated by the ADC is multiplied by a digital LO that effectively mixes the signal at the IF down to DC. The DC tone is accumulated over time by accumulator2, and then the amplitude is output (DC term a energy at IF). This DC measurement is repeated with accumulator1 offset by 90° to serially generate I and Q DC terms to accurately measure power.

The digital LO with which the digitized IF is multiplied is provided by accumulating (with accumulator1) an N-bit frequency word representing the IF over time to assess phase information (for purposes of identifying a local oscillator signal having known spurs associated therewith). The accumulator1 outputs θ(t), which represents phase as a function of time and can be used to identify the relevant LO. In this particular example, the phase information is then provided to a lookup table (which in this embodiment is implemented with ROM, although other suitable lookup table configurations can be used as well), which in turn causes the lookup table to output the corresponding sinusoidal signal, sin 2(πft). Thus, the spurious tone and its amplitude can be identified by the ORA, so that the corresponding phase and gain settings of the comb generator can be subsequently retrieved from memory (based on the active aggressor source).

In this example, the ORA is digitally based, in that it digitally down-converts the IF to zero and accumulates over time to effectively look for energy. Note, however, that this could be done in the analog domain as well with, for example, a phase lock loop (PLL) and a down-converting mixer to DC. In still other embodiments, the ORA can be implemented, for instance, as described in U.S. Pat. No. 7,428,683, which is hereby incorporated in its entirety by reference.

As will be appreciated in light of this disclosure, the spur-canceller circuitry can be implemented independently of the circuit to be protected from spurious signals, or integrated into the circuit to be protected from spurious signals. In one example case, for instance, each of the comb generator with variable phase and gain, gain stages A1 and A2, local oscillator, mixer, and summer module are all implemented on the same integrated circuit (e.g., chip or chip set). Other embodiments, such as a dual RF converter embodiment, may include other components as well, such as the other mixer and local oscillator circuitry and other typical receiver front-end componentry.

Dual RF Converter

Figure 4:
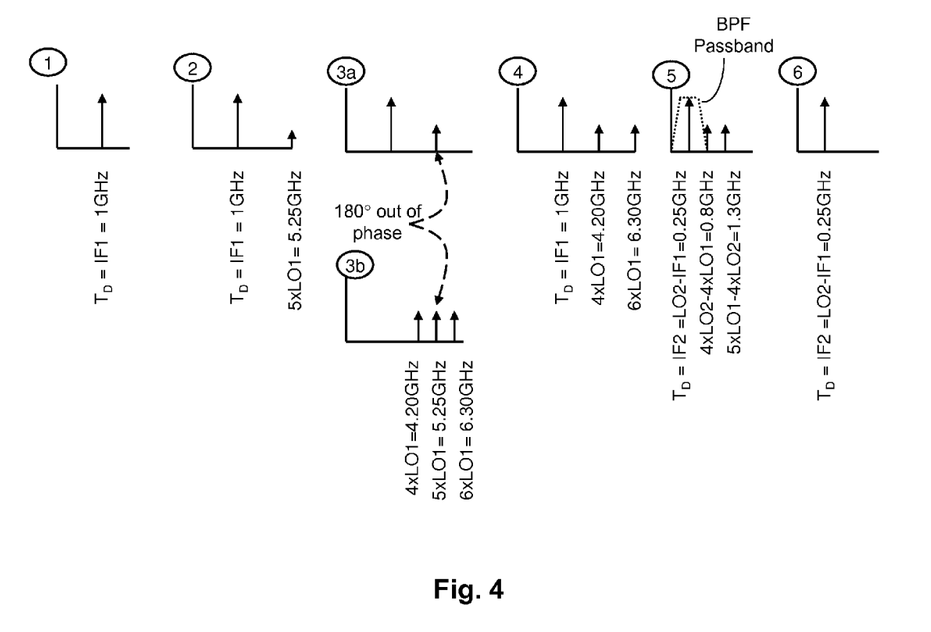
FIG. 4 illustrates an example spectrum associated with points 1 through 6 designated on the RF converter block diagram of FIG. 1, in accordance with one embodiment of the present invention.

FIG. 4 illustrates an example spectrum associated with points 1 through 6 designated on the RF converter block diagram of FIG. 1, in accordance with one embodiment of the present invention. For purposes of this example and related discussion, assume the application is for a dual RF converter having a first local oscillator (LO1) and a second local oscillator (LO2), as well as first and second mixers. In such a case, further assume that LO1 is the aggressor source $T_A$, IF1 (output by the first converter stage) is the desired tone $T_D$ before conversion, and IF2 (output by the second converter stage) is the desired tone $T_D$ after conversion. Further assume that: IF1=1.0 GHz; IF2=0.25 GHz; and LO2=1.25 GHz. Further assume that the first converter is tuned to 50 MHz (i.e., RF transmission frequency is 50 MHz). Thus, LO1 is equal to 1.05 GHz in this example (LO1=RF+IF1).

As can be seen at point 1 of FIG. 4, the $T_D$ is IF1, which is a 1 GHz tone. At point 2 of FIG. 4, note that the fifth harmonic of LO1 (5×LO1, which equals 5.25 GHz) has leaked into the second converter (after the IF filters of the first converter), and mixes with the fourth harmonic of LO2 and lands on IF2. This can be represented mathematically as: mLO1−nLO2, where m=5 and n=4. Thus, mLO1−nLO2=5×1.05 GHz−4×1.25 GHz 0.25 GHz (which is IF2).

As previously explained, the digital controller senses that LO1 is 1.05 GHz, or otherwise passes that information to the memory (e.g., lookup table indexed by LO1 identifier), which in turn causes the lookup table to output the corresponding amplitude and phase settings (of the comb generator) necessary to cancel tone $T_{AH}$ (which is in this case is LO1 or a harmonic thereof) to the comb generator with variable phase and gain. The comb generator then creates phase coherent harmonics of LO1 (e.g., m=1 to 6) having phase and amplitude such that the fifth harmonic in the comb output is equal in amplitude and opposite in phase to the leaked tone $T_{AH}$. This tone is now cancelled out, by operation of the summing module, and as shown at points 3a and 3b.

The comb generator also creates other tones, such as: (m−1)×LO1, (m+1)×LO1, etc (tones at 4×LO1 and 6×LO1 are shown at point 4 of FIG. 4, at 4.2 GHz and 6.3 GHz, respectively). Such tones that manifest in the spectrum will get mixed by the second converter. For instance, and as shown at point 5, tones at (m+1)LO1−nLO2 and (m−1)LO1−nLO2 appear at the output of the mixer (in addition to $T_D$), which are 1.3 GHz and 0.8 GHz, respectively These other tones are generally outside the passband of the BPF and are therefore filtered out. The BPF passband is generally shown as a dashed outline at point 5 in FIG. 4. Then, the output of the second RF converter stage includes only the down-converted desired tone $T_D$, which is IF2 (LO2−IF1=0.25 GHz).

The polluting tones are separated in the frequency domain by frequency of the aggressor $T_A$ (in this case LO1). Thus, there will always be a tone at the IF2 that is equal to IF2+LO1. This can be represented mathematically as: (m+1)LO1−nLO2=1.3 GHz; and IF2+LO1=1.3 GHz. Thus, in some embodiments, the bandwidth of the BPF is configured to be less than 2×LO1, so that the (m+1)×n term is filtered out. In the case of the present example shown in FIG. 4, the (m−1)×n tone is closer to the IF2 then the (m+1) tone, where (m−1) LO1−nLO2=0.8 GHz. Thus, in accordance with one example embodiment, the BPF has a bandwidth that is 2×(0.8 GHz−IF2).

As will be appreciated, the spur canceller technique provided herein eliminates one tone, at the expense of potentially magnifying other tones, as it is possible that previously insignificant spurs may become significant due to other tones included in the comb output. The likelihood of this happening depends on a number of factors such as the density of spurs relative to the bandwidth of the BFP bandwidth and shape. In general, the smaller the BPF bandwidth, the more likely such other tones will be filtered out by the BPF. Spur-density is generally proportional to the BPF bandwidth and inversely proportional to 1/LO and 1/aggressor $T_A$.

The comb generator creates multiple phase coherent harmonics of the aggressor. Once per cycle, these harmonics will add in phase, and generate a large amplitude output. If the peak output is too large, it may saturate the mixer. So there is a limit to the largest magnitude of spur that can be cancelled. In this sense, the more tones that are kept out of the comb generator output, the lower this limit will be. Thus, and in accordance with one embodiment of the present invention, the comb generator output can be filtered such that only a limited number of tones are kept. In this way, the peak to average value will be lower, and a larger magnitude spur can be cancelled. In one specific such embodiment, the comb generator with VGPR is configured with a filtering function to minimize the peak comb output relative to the tone $T_{AH}$. Note, however, that such optional filtering of the comb output is not required.

Methodology

Figure 5A:
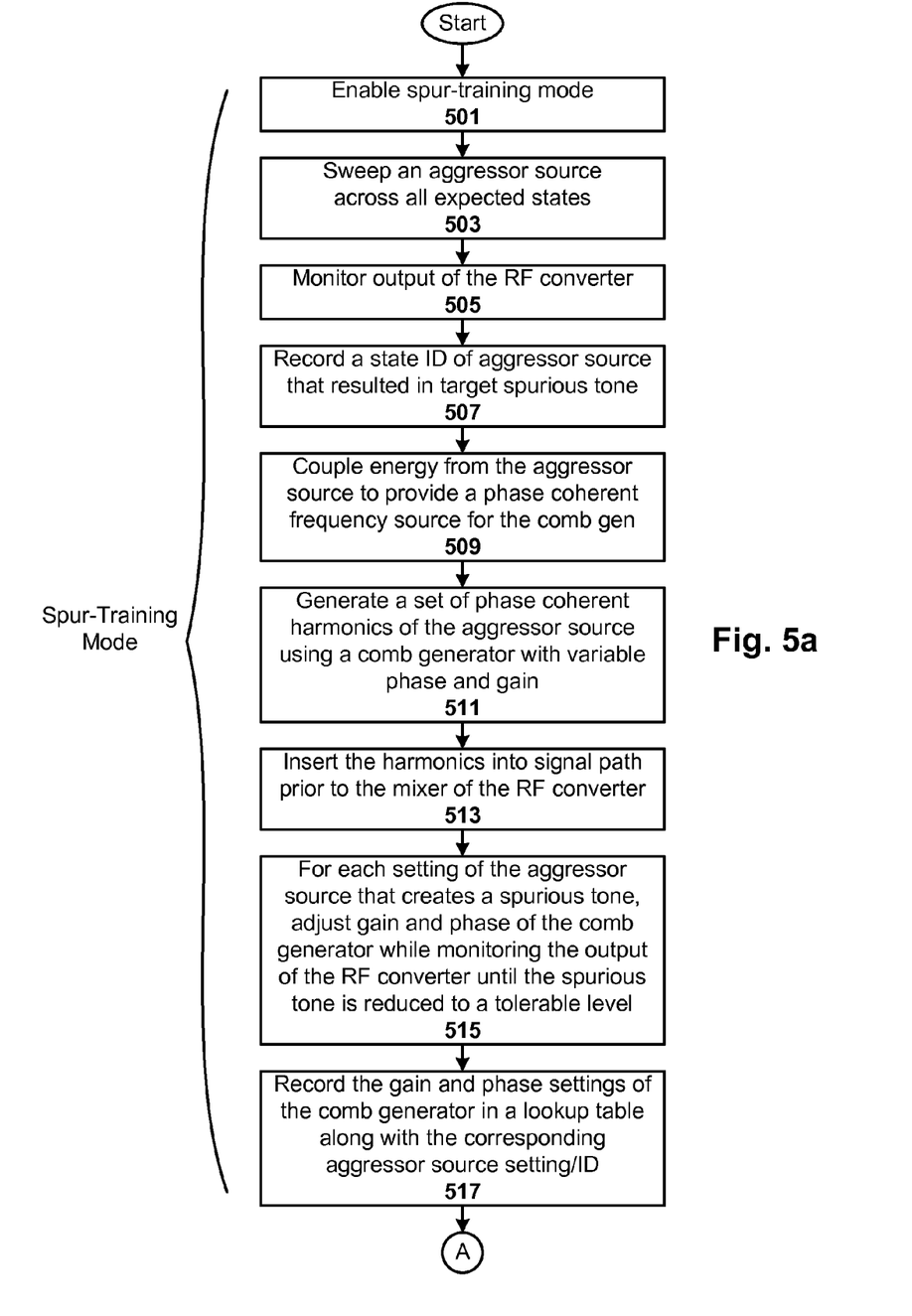
FIGS. 5a-b illustrate a method for canceling spurious tones in an RF converter, in accordance with an embodiment of the present invention.
Figure 5B:
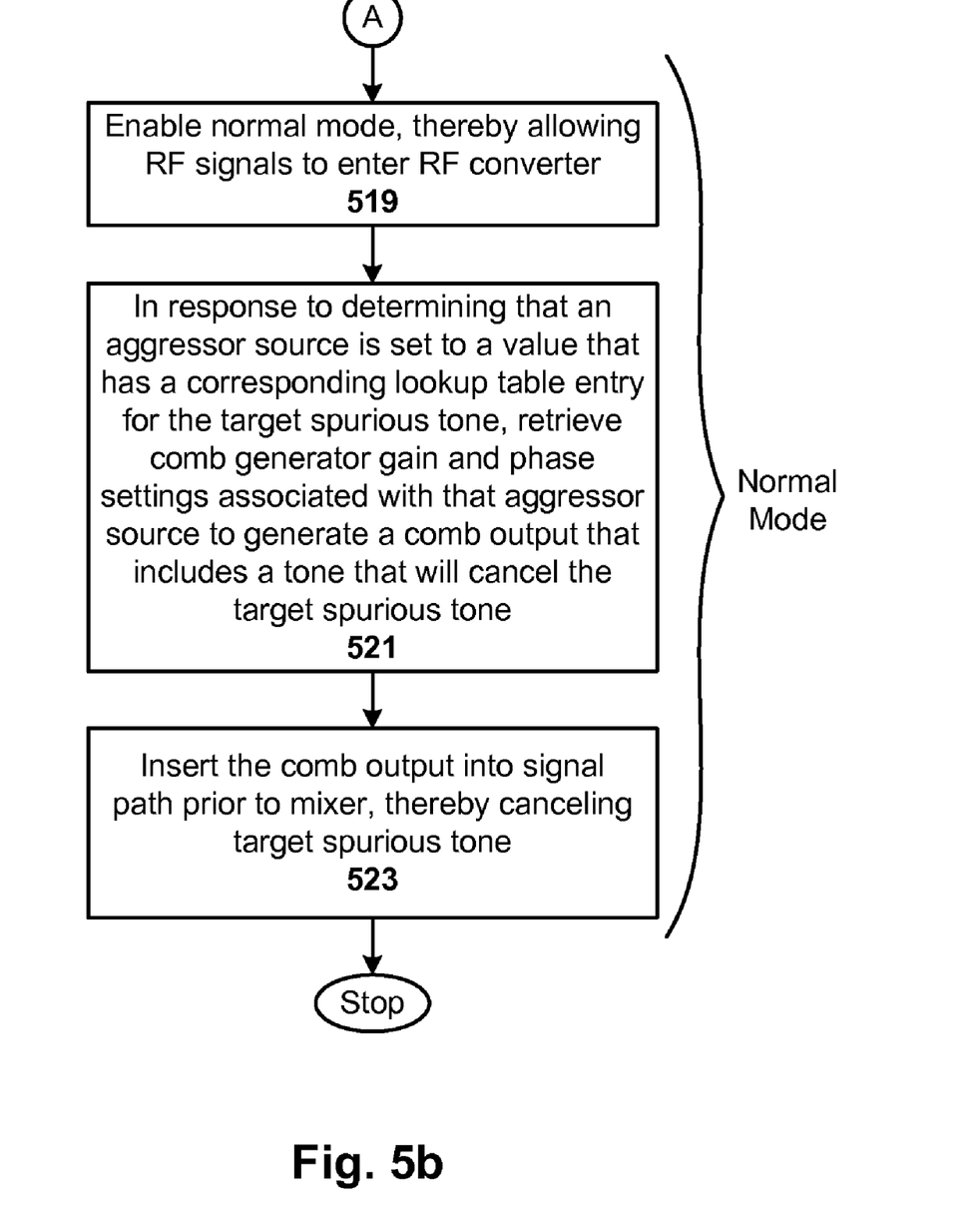

FIGS. 5a-b illustrate a method for canceling spurious tones in an RF converter, in accordance with an embodiment of the present invention. The method can be implemented, for instance, by an SoC, such as an integrated RF converter or a RF receiver on a chip. The method includes a spur-training mode and a normal RF receiver mode (generally referred to as normal mode).

The method begins with enabling 501 the spur-training mode, wherein only spurious tones are present (no RF input or other desired signals). This may entail, for example, disconnecting or otherwise disabling the antenna (e.g., configuring antenna to quiet state). This may further entail enabling a closed feedback loop as previously described that is used during spur-training mode only, and the closed loop feedback loop is opened or otherwise disabled when in normal mode.

With no signal coming into the RF converter, the method continues with sweeping 503 an aggressor source across all expected states, and monitoring 505 the output of the RF converter (e.g., via the digital controller based on input from the ORA). Sweeping the aggressor source across all expected states at step 505 depends on the purpose of the aggressor source when the RF converter is operating in normal mode. For instance, if the aggressor source is a first LO in a dual RF converter system, then sweeping the aggressor source across all expected states may entail running the first LO at each of its normal mode frequencies. Alternatively, if the aggressor source is a clock, then sweeping the aggressor source across all expected states may entail running the clock at each of its normal mode frequencies. Other aggressor sources, and their corresponding function and frequency range during normal mode, will be apparent in light of this disclosure.

In the spur-training mode, if energy is detected at step 505 (e.g., by the ORA), then that energy is assumed to be a spurious tone. Thus, the method continues with recording 507 a setting or the pertinent parameters (or any suitable state identifier) of an aggressor source that resulted in the target spurious tone. For instance, if the aggressor source is a first LO, then record the frequency of the LO when the spurious tone occurred. If the aggressor source is a clock, then record the frequency of the clock when the spurious tone occurred. In general, the state identifier can be any parameter or feature associated with the aggressor source state that can be readily detected to facilitate identification of that aggressor source state.

The method continues with coupling 509 energy from the aggressor source to provide a phase coherent frequency source (for the comb generator), and generating 511 a set of phase coherent harmonics of the aggressor source using a comb generator with variable phase and gain. These harmonics are effectively tones. The method continues with inserting 513 these harmonics or tones into the signal path prior to the mixer of the RF converter. Recall that, in some embodiments, the comb generator with various phase and gain can be configured with a filtering function to minimize peak comb output relative to the spurious tone.

For each setting of the aggressor source that creates a spurious tone, the method continues with adjusting 515 the gain and phase of the comb generator while monitoring the output of the RF converter (e.g., via the digital controller based on input from the ORA) until the spur is reduced to an acceptable level. After an acceptable level is achieved, the method continues with recording 517 the gain and phase settings of the comb generator in a lookup table along with the corresponding aggressor source setting or state identifier. Note that steps 503 through 517 can be repeated for each of a number of aggressor source state IDs, as well as for each different aggressor source. For instance, if the aggressor source is a first LO in a dual RF converter application, then that aggressor source may have three different settings or state identifiers: ID_1=1.0 GHz; ID_2=1.5 GHz; and ID_3=2.0 GHz. Each of these three aggressor source state IDs (or a subset thereof) could be associated with a spurious tone that can be cancelled as described herein.

The method continues with enabling 519 normal mode, thereby allowing signal to enter on the RF path of the RF converter. In response to determining that an aggressor source is set to a value that has a corresponding lookup table entry for a target spurious tone, the method continues with retrieving 521 comb generator gain and phase settings associated with that aggressor source to generate a comb output that includes a tone that will cancel the target spurious tone. Note that when the aggressor source does not have a spur associated with it, the spur cancellation can be disabled, if so desired. The method continues with inserting 523 the comb output into the signal path prior to the mixer of the RF converter, thereby canceling the target spurious tone.

Thus, the techniques described herein can be used to allow integration of multiple RF converters on a single integrated circuit while maintaining acceptable spurious response, thereby further allowing for improvements in size, weight, power and cost. Other applications susceptible to spurious signals can also benefit from the techniques, as will be apparent in light of this disclosure. The amount of spurious cancellation is independent of the power of the aggressor's source. Rather, the amount of spurious cancellation is effectively determined by the resolution and range of the variable gain and phase of the comb generator. In addition, note that the techniques eliminate spurious tones regardless of the leakage path. For instance, leakage occurring off-chip at the board level can be addressed by these techniques. Further note that the techniques allow the cancellation signal to be summed with the desired signal immediately prior to the frequency conversion step. This allows for the signal to experience more gain before the summation, improving the overall noise figure of the cancellation system. Embodiments of the present invention can be used to cancel interference from any source, including digital clocks, as long as the aggressor source can be sampled coherently, and the fundamental frequency of the aggressor source is greater than converter's IF filter bandwidth. The techniques do not require knowledge of which harmonic of the aggressor is mixing into the IF. Nor is it necessary to actually measure the phase or amplitude of the spurious tone to be cancelled. The techniques may be applied at multiple stages of a heterodyne receiver.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for canceling spurious tones in an RF converter having a mixer and an output, the method comprising:
   in a spur-training mode wherein a spurious tone associated with an aggressor source is present, generating a set of phase coherent harmonics of the aggressor source using a comb generator with variable phase and gain;
   inserting the harmonics into a signal path prior to the mixer;
   adjusting gain and phase of the comb generator while monitoring the output of the RF converter until the spurious tone is reduced to an acceptable level; and
   after the spurious tone is reduced to an acceptable level, storing the corresponding gain and phase settings of the comb generator along with a corresponding aggressor source state identifier.

2. The method of claim 1 further comprising:
   in a normal mode, retrieving comb generator gain and phase settings associated with the aggressor source state identifier to generate a comb output that includes a tone that will cancel the spurious tone; and
   inserting the comb output into the signal path prior to the mixer, thereby canceling the spurious tone.

3. The method of claim 1 wherein during the spur-training mode, the method further comprises the preliminary steps of:
   sweeping the aggressor source across all expected states, and monitoring the output of the RF converter; and
   recording an identifier of each aggressor source state that results in a spurious tone to be cancelled in normal mode.

4. The method of claim 1 wherein generating a set of phase coherent harmonics of the aggressor source using a comb generator with variable phase and gain comprises coupling energy from the aggressor source and filtering to minimize a peak comb output relative to the spurious tone.

5. The method of claim 1 wherein storing the corresponding gain and phase settings of the comb generator along with a corresponding aggressor source state identifier comprises recording the corresponding gain and phase settings in a lookup table that is indexed by aggressor source state identifiers.

6. The method of claim 5 wherein the method further comprises determining, in a normal mode, that the aggressor source is associated with the aggressor source state identifier, and that the aggressor source state identifier corresponds to an entry in the lookup table.

7. A system for canceling spurious tones in an RF converter having a mixer and an output, the system comprising:
   a comb generator with variable phase and gain for generating, in a spur-training mode wherein a spurious tone associated with an aggressor source is present, a set of phase coherent harmonics of the aggressor source;
   a summer module for inserting the harmonics into a signal path prior to the mixer;
   a digital controller for adjusting gain and phase of the comb generator while monitoring the output of the RF converter until the spurious tone is reduced to an acceptable level; and
   a memory for storing, after the spurious tone is reduced to an acceptable level, the corresponding gain and phase settings of the comb generator along with a corresponding aggressor source state identifier.

8. The system of claim 7 wherein the digital controller is further configured for retrieving from the memory, in a normal mode, comb generator gain and phase settings associated with the aggressor source state identifier to generate a comb output that includes a tone that will cancel the spurious tone, and the summer module is further configured for inserting the comb output into the signal path prior to the mixer, thereby canceling the spurious tone.

9. The system of claim 7 wherein during the spur-training mode, the aggressor source is swept across all expected states, and the digital controller is further configured for monitoring the output of the RF converter and recording in the memory an identifier of each aggressor source state that results in a spurious tone to be cancelled in normal mode.

10. The system of claim 7 wherein the comb generator with variable phase and gain for generating a set of phase coherent harmonics of the aggressor source is further configured for coupling energy from the aggressor source and filtering to minimize peak comb output relative to the spurious tone.

11. The system of claim 7 wherein the memory for storing the corresponding gain and phase settings of the comb generator along with a corresponding aggressor source state identifier comprises a lookup table for recording the corresponding gain and phase settings and that is indexed by aggressor source state identifiers.

12. The system of claim 11 wherein the digital controller is further configured for determining, in a normal mode, that the aggressor source is associated with the aggressor source state identifier, and that the aggressor source state identifier corresponds to an entry in the lookup table.

13. The system of claim 7 wherein the system is included in a system-on-chip configuration.

14. The system of claim 7 wherein the RF converter is a dual RF converter having first and second converter stages, and the aggressor source is a local oscillator associated with the first converter stage.

15. A system for canceling spurious tones in an RF converter having a mixer and an output, the system comprising:
- a comb generator with variable phase and gain for generating, in a spur-training mode wherein a spurious tone associated with an aggressor source is present, a set of phase coherent harmonics of the aggressor source;
- a summer module for inserting the harmonics into a signal path prior to the mixer;
- a digital controller for adjusting gain and phase of the comb generator while monitoring the output of the RF converter until the spurious tone is reduced to an acceptable level; and
- a memory for storing, after the spurious tone is reduced to an acceptable level, the corresponding gain and phase settings of the comb generator along with a corresponding aggressor source state identifier;
- wherein the system is included in a system-on-chip configuration, and the RF converter is a dual RF converter having first and second converter stages, and the aggressor source is a local oscillator associated with the first converter stage.

16. The system of claim 15 wherein the digital controller is further configured for retrieving from the memory, in a normal mode, comb generator gain and phase settings associated with the aggressor source state identifier to generate a comb output that includes a tone that will cancel the spurious tone, and the summer module is further configured for inserting the comb output into the signal path prior to the mixer, thereby canceling the spurious tone.

17. The system of claim 15 wherein during the spur-training mode, the aggressor source is swept across all expected states, and the digital controller is further configured for monitoring the output of the RF converter and recording in the memory an identifier of each aggressor source state that results in a spurious tone to be cancelled in normal mode.

18. The system of claim 15 wherein the comb generator with variable phase and gain for generating a set of phase coherent harmonics of the aggressor source is further configured for coupling energy from the aggressor source.

19. The system of claim 15 wherein the memory for storing the corresponding gain and phase settings of the comb generator along with a corresponding aggressor source state identifier comprises a lookup table for recording the corresponding gain and phase settings and that is indexed by aggressor source state identifiers.

20. The system of claim 19 wherein the digital controller is further configured for determining, in a normal mode, that the aggressor source is associated with the aggressor source state identifier, and that the aggressor source state identifier corresponds to an entry in the lookup table.

* * * * *